(12) United States Patent
Gonzalez Martin et al.

(10) Patent No.: US 12,560,905 B2
(45) Date of Patent: Feb. 24, 2026

(54) APPLYING SURFACE OFFSET TO A THREE-DIMENSIONAL OBJECT

(71) Applicant: Peridot Print LLC, Palo Alto, CA (US)

(72) Inventors: Sergio Gonzalez Martin, Sant Cugat del Valles (ES); Manuel Freire Garcia, Sant Cugat del Valles (ES); Leticia Rubio Castillo, Sant Cugat del Valles (ES)

(73) Assignee: Peridot Print LLC, Palo Alto, CA (US)

( * ) Notice: Subject to any disclaimer, the term of this patent is extended or adjusted under 35 U.S.C. 154(b) by 469 days.

(21) Appl. No.: 18/013,820

(22) PCT Filed: Jul. 30, 2020

(86) PCT No.: PCT/US2020/044236
§ 371 (c)(1),
(2) Date: Dec. 29, 2022

(87) PCT Pub. No.: WO2022/025896
PCT Pub. Date: Feb. 3, 2022

(65) Prior Publication Data
US 2023/0297069 A1 Sep. 21, 2023

(51) Int. Cl.
*G05B 19/4099* (2006.01)
*B33Y 50/02* (2015.01)

(52) U.S. Cl.
CPC .......... *G05B 19/4099* (2013.01); *B33Y 50/02* (2014.12); *G05B 2219/35134* (2013.01)

(58) Field of Classification Search
CPC ...... G05B 19/4099; G05B 2219/35134; B33Y 50/02; B33Y 30/00; B22F 10/85; G06T 2219/2021; G06T 19/20
See application file for complete search history.

(56) References Cited

U.S. PATENT DOCUMENTS

| | | | |
|---|---|---|---|
| 10,307,969 B2 | 6/2019 | Carr et al. | |
| 10,357,957 B2 | 7/2019 | Buller et al. | |
| 10,434,573 B2 | 10/2019 | Buller et al. | |
| 10,688,722 B2 | 6/2020 | Buller et al. | |
| 2014/0107823 A1* | 4/2014 | Huang | B29C 64/393 |
| | | | 700/98 |
| 2015/0148930 A1* | 5/2015 | Kumar | G06T 19/20 |
| | | | 700/98 |
| 2019/0315048 A1 | 10/2019 | Sterman et al. | |
| 2020/0142383 A1 | 5/2020 | Hiji et al. | |
| 2021/0394450 A1* | 12/2021 | Shepherd | B29C 64/393 |

FOREIGN PATENT DOCUMENTS

| | | |
|---|---|---|
| CA | 2751514 A1 | 5/2002 |
| EP | 3020537 A1 | 5/2016 |
| JP | 2016-215597 A | 12/2016 |

* cited by examiner

*Primary Examiner* — Yuhui R Pan
(74) *Attorney, Agent, or Firm* — Michael Dryja

(57) ABSTRACT

A method is described in which model data describing a three-dimensional object is received. A first offset is applied to a surface of the object, the first offset being applied to the model data. The model data is converted to voxel data, and a second offset is applied to the surface of the object, the second offset being applied to the voxel data.

20 Claims, 4 Drawing Sheets

(a)

(b)

(c)

(d)

20

PRINT CALIBRATION OBJECTS — 21

MEASURE GEOMETRIC DEVIATIONS — 22

CALCULATE AVERAGE SURFACE OFFSET — 23

CALCULATE DIFFERENCE VALUES — 24

GENERATE DIMENSIONAL PROFILE — 25

APPLYING SURFACE OFFSET TO A THREE-DIMENSIONAL OBJECT

BACKGROUND

In some 3D printing systems, an object may be formed layer-by-layer through the selective solidification of a build material. Geometric differences may arise between the printed object and the 3D model. In order to compensate for these geometrical differences, a geometric transformation may be applied to the 3D model prior to printing.

DETAILED DESCRIPTION

In some 3D printing systems, an object may be formed layer-by-layer through the selective solidification of a build material. In some examples, selective solidification may be achieved by fusing the build material. For example, in selective laser sintering systems, a focused laser may be used to apply thermal energy to specific portions of the layer of build material to cause fusing. In agent-based jetting systems, a fusing agent may be printed onto specific portions of the layer of build material and a non-focused heat source may apply thermal energy to the build material. Those portions of the build material on which the fusing agent is printed absorb sufficient energy to cause those portions to fuse. In another example of agent-based jetting, selective solidification may be achieved by printing a binding agent onto specific portions of the layer of build material.

A 3D printing system may form an object based on a digital 3D model of the object. The 3D model may be processed to generate 2D slices, each slice defining a portion of a respective layer of build material that is to be solidified.

Figure 1:
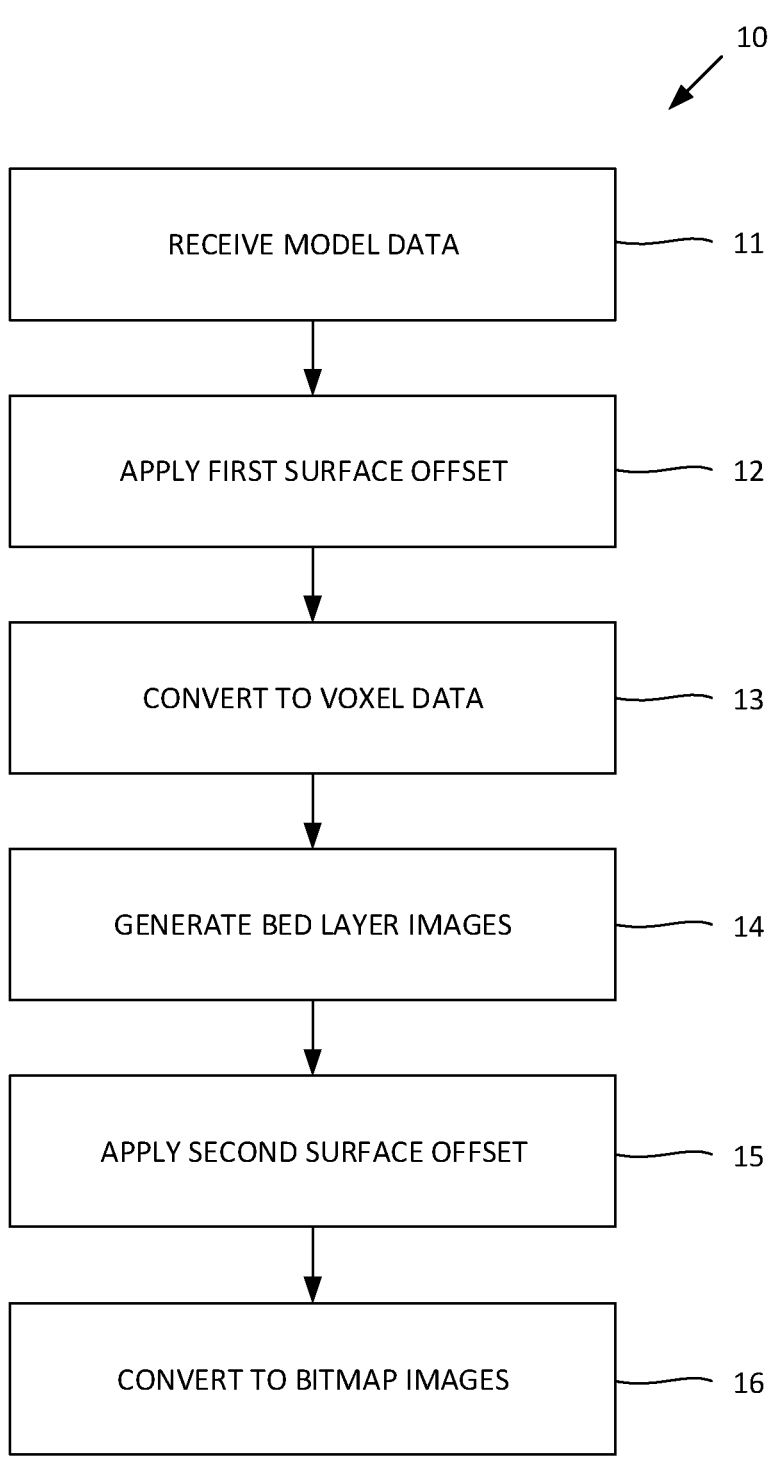
FIG. 1 illustrates an example method for processing a 3D model of an object.

FIG. 1 shows an example method for processing a 3D model of an object.

The method 10 comprises receiving 11 model data that describes an object to be printed. The model data may be in any format that describes the object digitally. In one example, the model data may comprise a mesh, for example a polygon mesh such as a triangular mesh. In another example, the model data may comprise a stack of polygons. The model data may be received in one of number of different file formats, such as STL, SVG, OBJ, and 3MF.

In addition to the model data, additional data may be received that relates to the object. The additional data may, for example, include information regarding the position of the object within the build volume, or the build material to be used for the object.

The method 10 may comprise receiving model data for a plurality of objects to be printed. In this instance, model data is received for each of the plurality of objects. The model data may be received as a single file, such as a 3MF file, or as a plurality of files, such as STL files.

The method 10 comprises applying 12 a first surface offset to the model data.

When an object is formed by 3D printing, geometric differences may arise between the printed object and the 3D model. For example, where the object is formed by thermally fusing the build material, the heat generated may cause the printed object to expand. The printed object may also shrink during cooling. As a further example, build material surrounding the printed object may adhere to the surface of the printed object, due to thermal bleed, causing the object to increase in size.

In order to compensate for these geometrical differences, a geometric transformation may be applied to the 3D model. The geometric transformation may comprise applying a scaling factor and/or a surface offset to the 3D model.

A surface offset may be applied by adding or removing a specified amount (i.e. an offset) from a surface of the object. An offset may be applied to surfaces of the object along each of the x, y and z axes. Moreover, the surface offsets may be anisotropic, which is to say that a different offset may be applied along each axis.

Various methods are available for applying an offset to a surface of the object. In one example, the first surface offset may be applied by moving vertices of the model data. In another example, the first surface offset may be applied using a Minkowski sum when converting the model data into voxel data, as described below.

The magnitude of the first surface offset may depend on a property of the object to be printed. For example, the first surface offset may depend on the build material of the object, the position of the object within the build volume, the size and/or shape of the object, and/or the proximity of the object to other objects within the build volume. For some build materials, the printed object may grow or expand during the object generation; for other build materials, the printed object may shrink or contract during the object generation process. Geometric deviations in the printed object may therefore depend, at least partly, on the type of build material used to form the printed object. The temperature of the printed object during the object generation process may also influence geometric deviations in the printed object. The temperature of a printed object may vary according to its position within the build volume. For example, an object printed at the centre of the build volume may become hotter than an object printed towards the top of the build volume. The temperature of a printed object, during the object generation process, may also depend on the size and/or shape of the object, or the proximity of other printed objected. By applying a surface offset that depends on a property of the object (e.g. build material, build position, size and/or shape, proximity of other objects), greater dimensional accuracy and reproducibility may be achieved.

Where multiple objects are to be printed, a different surface offset may be applied to the model data of each object. Moreover, where multiple versions of the same object are to be printed, a different surface offset may be applied to each version of the object.

The method 10 comprises converting 13 or rendering the model data into voxel data. This process is sometimes referred to as voxelization and comprises converting the continuous geometric representation of the object, as defined by the model data, into a grid of discrete volume elements or voxels. Various methods are available for converting model data into voxel data. Depending on the method used, the resulting voxels may be of uniform size, or may be of different sizes. In one example, the model data may be converted into voxel data using an octree-based voxelization.

As noted above, the first surface offset may be applied to the model data when converting the model data to voxel data. In one example, the first surface offset may be applied to the model data using a Minkowski sum, sometimes referred to as a Minkowski sweep. In this example, an offset element is defined using the surface offset. For example, the first surface offset may comprise positive surface offsets of $\Delta x$, $\Delta y$, $\Delta z$. The offset element may then be defined as a volume having the dimensions $2\Delta x$, $2\Delta y$, $2\Delta z$. The centre of the offset element is then swept around the boundary of the object before determining which of the voxels intersect the surface of the object. Since the Minkowski sum is applied before determining which of the voxels intersect the surface of the object, the first surface offset is in effect applied to the model data. Where the first surface offset is negative, the object may be inverted such that external surfaces are redefined as internal surfaces. The surface offset may then be applied as a positive offset, and the resulting modified object may be inverted once again in order to restore the object to its correct state, but with a negative offset now applied.

Following voxelization, the method 10 comprises generating 14 a plurality of bed layer images. Each bed layer image corresponds to a horizontal layer of the build to be printed. Each bed layer image comprises pixels, with each pixel representing a voxel of a predetermined size. The voxel represented by each pixel corresponds to a 3D region of the print bed that may be individually addressed by a 3D printing system. Accordingly, each pixel may represent a voxel of any predetermined size which the 3D printing system is capable of individually addressing. The size of each pixel of the bed layer image may therefore be defined by the resolution of the 3D printing system. For example, a 3D printing system that uses printheads having a resolution of 1200 dpi is capable of individually addressing a region 21×21 microns. The height of each region is defined by the height of the build layer, i.e. the amount by which the print bed is lowered with each successive layer. Accordingly, if the height of each build layer is 80 microns then each pixel of the bed layer image may be said to represent a voxel of 21×21×80 microns in size. It is not always the case that the highest printing resolution of a 3D printing system is used when printing an object. For example, although a 3D printing system having a resolution of 1200 dpi is capable of individually addressing a region of 21×21 microns, the build material may have an average particle size of around 50 microns. In this instance, the 3D printing system may employ a lower print resolution of, say, 600 dpi, with each pixel representing a voxel of 42×42×80 microns in size.

Each bed layer image comprises voxel data of those objects that are intersected by the bed layer. Each bed layer image may be generated by determining which objects are intersected by the bed layer, based on the positions of the objects within the build volume. If an object is intersected by the bed layer, a corresponding slice of voxel data of the object is extracted. The extracted slice is then positioned within the bed layer image according to the position of the object within the build volume. The pixels of the extracted slice may be greater in size than the pixels of the bed layer image. This may be the case, for example, if the voxel data of the object are stored as a tree data structure, such as an octree. Where the extracted slice comprises pixels of greater size, the pixels of the slice are converted or rendered into pixels having the same size as that of the bed layer image.

The method 10 comprises applying 15 a second surface offset to the object. The second surface offset is applied to the voxel data, and may be applied to the pixels of the bed layer images. Applying the second surface offset may comprise adding (positive offset) or removing (negative offset) pixels from the bed layer image. This then has the net result of adding or removing voxels of a predetermined size from the voxel data. For example, if each pixel of the bed layer image represents a voxel of 21×21×80 microns, then a surface offset $\Delta x$ of −105 microns may be achieved by removing 5 pixels along the x-axis from each of the surfaces of the bed layer image.

Where a plurality of objects are to be printed, the second surface offset may be common to each of the objects; that is to say that the same second surface offset may be applied to each of the objects. This then simplifies the application of the second surface offset to the objects. In particular, the second surface offset may be applied to the pixels of each bed layer image without having to determine which pixels (and thus which voxels) belong to which object.

In some examples, relatively small features may be removed from the object upon applying the second surface offset. For example, a small protrusion may be eroded by the application of a negative offset, or a small indentation may be filled by the application of a positive offset. To mitigate this, the method may employ a small feature protection (SFP) mechanism when applying the second surface offset. The SFP mechanism may, for example, identify features (e.g. indentations or protrusions) of the object having a size or dimension less than a threshold. Where small features are identified, the second surface offset may be disabled (i.e. not applied) to the surfaces of the small features.

In one example, the SFP mechanism may identify small features by applying the second surface offset to each bed layer image to generate a modified bed layer image. A surface offset having the opposite value to the second surface offset (i.e. same absolute value but opposite sign) is then applied to the modified bed layer image in order to restore the bed layer image. The restored bed layer image is then compared to the original bed layer image. Any differences between the two images indicates that a feature or features have been removed. So, for example, if the second surface offset along the x-axis is-105 microns, the SFP mechanism may apply a surface offset of −105 microns (e.g. removing five 21 micron pixels) to the bed layer image to generate an eroded bed layer image. A surface offset of +105 microns (e.g. adding five 21 micron pixels) is then applied to the eroded bed layer image to generate a restored bed layer image. The restored bed layer image is then compared to the original bed layer image, and any differences are identified as eroded features.

In another example, the SFP mechanism may identify small features as regions for which the number of consecutive fill pixels (protrusion) or the number of consecutive empty pixels (indentation) in any direction is less than a threshold. So, for example, a small protrusion may be regarded as a feature having a dimension in any direction of 200 microns or less. If the size of the voxel represented by each pixel of the bed layer is 21×21×80 microns, then a small protrusion may be identified as any region for which the number of consecutive fill pixels is 10 or less along the x-axis or the y-axis, or 3 or less along the z-axis.

After generating the bed layer images and applying the second surface offset, the method 10 comprises converting 16 each bed layer image into a bitmap image. This comprises converting the values of the pixels of the bed layer images from color values to printer contone values. In one example, the color values of the pixels may be binary or monochrome, e.g. black or white. In other examples, the color values may be a grayscale or full color values (e.g. RGB or CMYK). Grayscale or full color values may be used to generate objects or parts of an object with different colors or surface effects. Where the pixels of a bed layer image comprise color values for more than one color channel (e.g. RGB or CMYK), a bitmap image may be generated for each color channel.

Each contone value may define the amount of energy (e.g. laser sintering) or the amount of a functional agent (e.g. fusing agent or binding agent) to be applied to the corresponding physical location of the build layer.

The contone value of a pixel may be defined, not only by the color value of the pixel, but also by the position of the pixel within the object. Accordingly, pixels having the same color value (e.g. black) may have different contone values depending on their positions. For example, a pixel at a surface of the object may have a lower contone value than a pixel (having the same color value) at a centre of the object.

Figure 2:
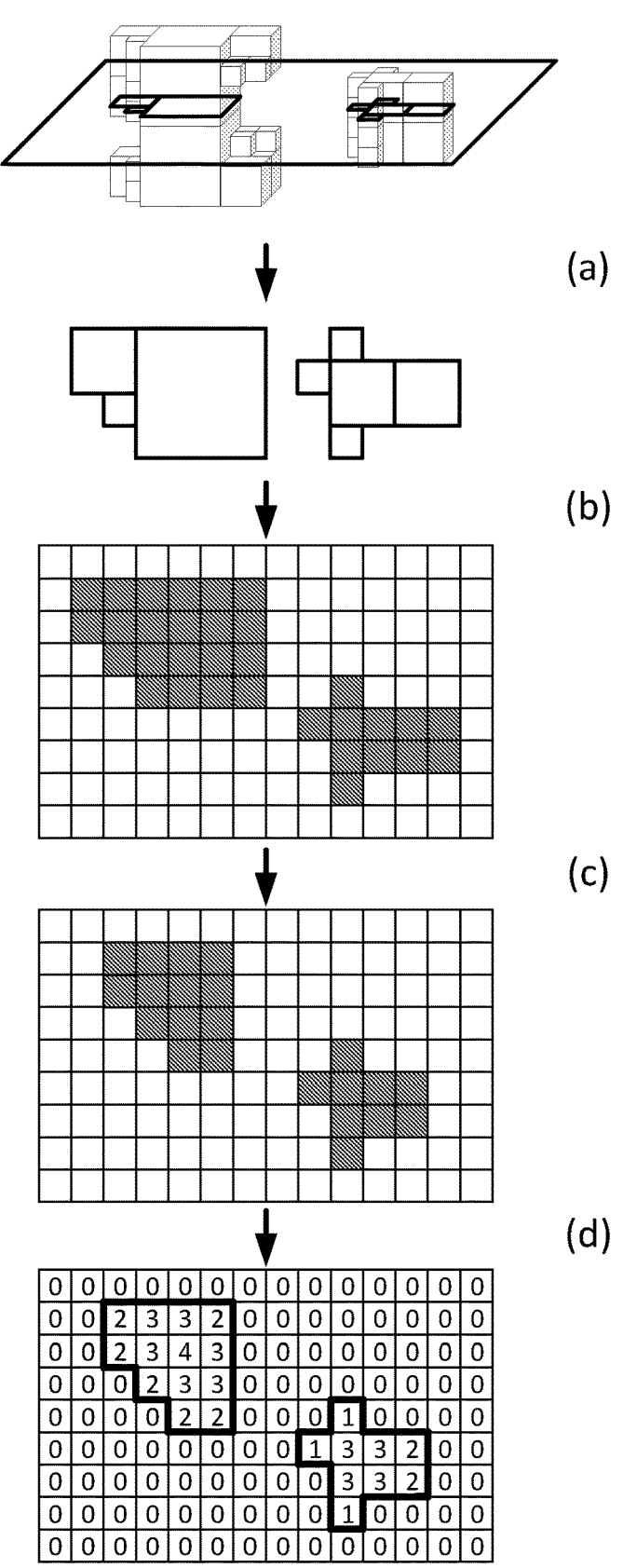
FIG. 2 illustrates a worked example for generating a bitmap image.

FIG. 2 shows a worked example of a method for generating a bitmap image.

In FIG. 2(a) a determination is made as to whether the bed layer intersects any of the objects to be printed. In this example, there are two objects to be printed, both of which are intersected by the bed layer. A slice of voxel data, corresponding to that intersected by the bed layer, is extracted for each object.

In FIG. 2(b) the slices of voxel data are positioned on the bed layer image according to the positions of the objects within the build volume. In this particular example, the slices have pixels that are greater in size than the pixels of the bed layer image. The pixels of each slice are therefore converted or rendered into smaller pixels.

In FIG. 2(c) the second surface offset is applied to the bed layer image. In this particular example, the second surface offset comprises removing a single pixel from surfaces in a direction parallel to the x-axis. An SFP mechanism is employed when applying the second surface offset. As a result, the single pixel features of the second object are preserved.

In FIG. 2(d) the color values of the bed layer image are converted into contone values to generate the bitmap image. In this example, the color values of the bed layer image are monochrome (black or white) and the contone values are defined by both the color values of the pixels and the positions of the pixels within the object.

With the method described above, a 3D model representing an object to be printed may be rendered into a stack of 2D layers or bitmaps. An offset is applied to the surface of the object during the rendering process. The total amount of surface offset to be applied to the object is divided into two components: a first surface offset and a second surface offset. The first surface offset is applied to the model data, and the second surface offset is applied to the voxel data of the object.

Conceivably, the total surface offset may be applied to just one of the model data and the voxel data. For example, a single surface offset may be applied to just the model data. As noted above, when applying a relatively large surface offset, small features (e.g. protrusions and indentations) may be removed. An SPF mechanism may be employed when applying the surface offset to the model data. However, identifying and protecting small features in the model data can be computationally expensive. Additionally, applying an SPF mechanism to the model data may introduce artifacts or discontinuities in the surface of the printed object, which may be visible in the printed object, e.g. a step in the surface of the printed object between a region where the surface offset is applied and a region where the surface offset is not applied.

A single surface offset may alternatively be applied to just the voxel data. However, the magnitude of the surface offset is then constrained to be a multiple of the minimum voxel size. Additionally, where the surface offset is applied to the bed layer image, the same surface offset is applied to multiple objects. However, it may be desirable to apply different surface offsets to different objects. For example, as noted above, the surface offset may depend on a property of the object, such as its position within the build volume.

By dividing the total surface offset into two components, and applying a first surface offset to the model data and applying a second surface offset to the voxel data, a surface offset of any value may be applied to the object whilst still achieving good SFP. For example, the second surface offset may be greater than the first surface offset. The bulk of the surface offset is therefore applied to the voxel data where a quicker and more robust SFP mechanism may be employed. Indeed, by ensuring that the first surface offset is no greater than a threshold, the first surface offset may be applied to the model data without the need to apply a SFP mechanism to the model data. By applying a surface offset to the model data, the magnitude of the total surface offset is not constrained to a multiple number of voxels. A total surface offset of any value may therefore be applied to an object. Moreover, different surface offsets may be applied to different objects within the same build. As a result, a greater dimensional accuracy and reproducibility may be achieved. In particular, the same dimensional accuracy may be achieved for an object irrespective of its position within the build volume.

Figure 3:
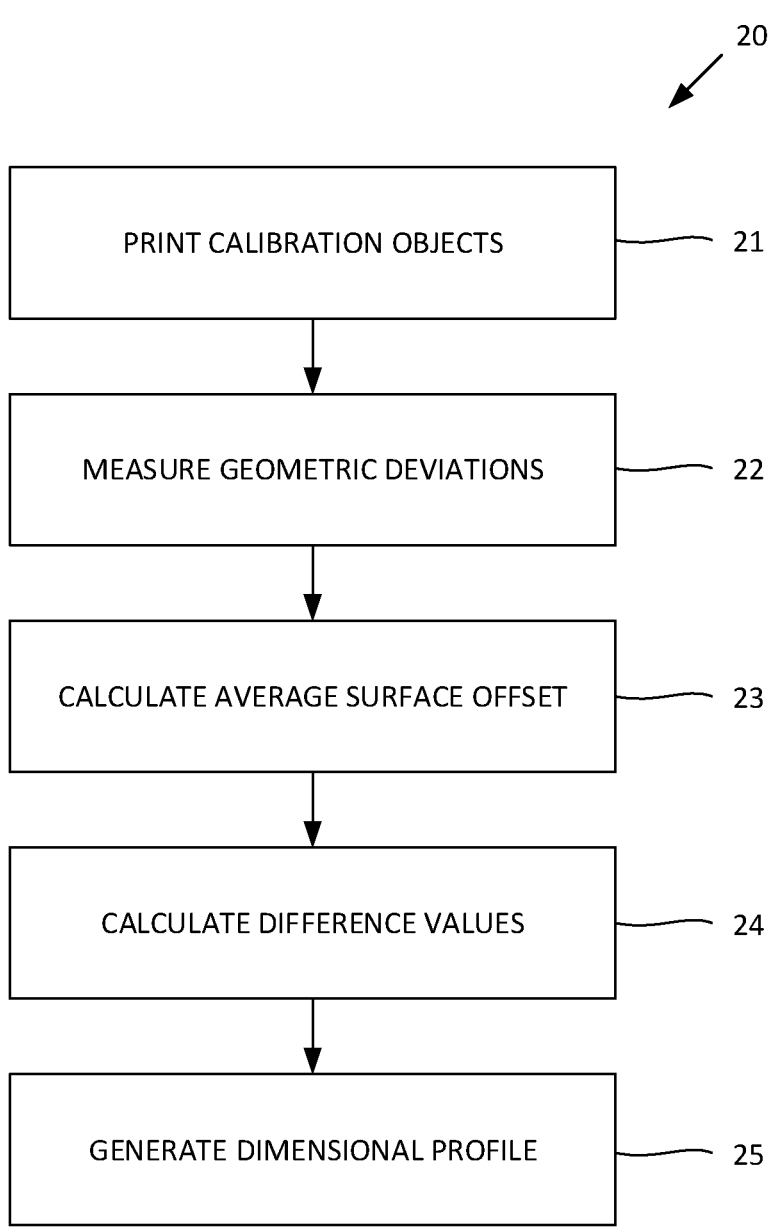
FIG. 3 illustrates an example method for calibrating a 3D printing system.

FIG. 3 shows an example method for calibrating a 3D printing system.

The method 20 comprises printing 21 a plurality of calibration objects at various positions within the build volume. Geometric deviations in each of the printed objects are measured 22 and from this surface offsets are calculated for each object. An average surface offset is calculated 23 for each axis based on the surface offsets of the printed objects. This average surface offset may then be stored as the second surface offset. Since the second surface offset is applied to the voxel data, the second surface offset is constrained to be a multiple of the minimum voxel size. Accordingly, the average surface offset may be rounded up or down to the nearest multiple number of voxels.

A difference value is then calculated 24 for each of the printed objects. The difference value corresponds to the difference between the surface offset for that object and the average surface offset. Accordingly, some of the difference values will be positive and some of the difference values will be negative. Each difference value effectively corresponds to a first surface offset for that object. These difference values are then used to generate 25 a dimensional profile. The dimensional profile describes the variation in the difference value across the whole of the build volume. The dimensional profile may therefore be used to generate a first surface offset for an object at any position within the build volume.

By way of example, four calibration objects may be printed and the geometric deviations measured. The surface offsets for the four printed objects, along the z-axis, may be 296, 344, 320 and 316 microns. The average surface offset is therefore 319 microns. However, the minimum voxel size in the z-axis may be 80 microns. Accordingly, an average surface offset of 320 microns is used and stored as the second surface offset. Difference values are then calculated for each of the printed objects, which in this example are: −24, +24, 0 and −4 microns. These four difference values are then used to generate the dimensional profile.

As noted above, geometric deviations in printed objects may differ for different build materials. For example, some build materials may cause a printed object to expand or grow, whereas other build materials may cause a printed object to shrink or contract. The calibration method may therefore be repeated for different build materials, with a dimensional profile and second surface offset generated for each build material.

When an object is subsequently printed, the dimensional profile may be used to calculate the first surface offset for the object based on its position within the build volume. As noted above, the first surface offset may additionally depend on other factors, such as the size and/or shape of the object, and/or the proximity of the object to other objects within the build volume.

The example method described above and illustrated in FIG. 1 may be implemented by a computing system which then sends the plurality of bitmaps to a 3D printing system. Alternatively, the method may be implemented wholly or in part by a 3D printing system.

Figure 4:
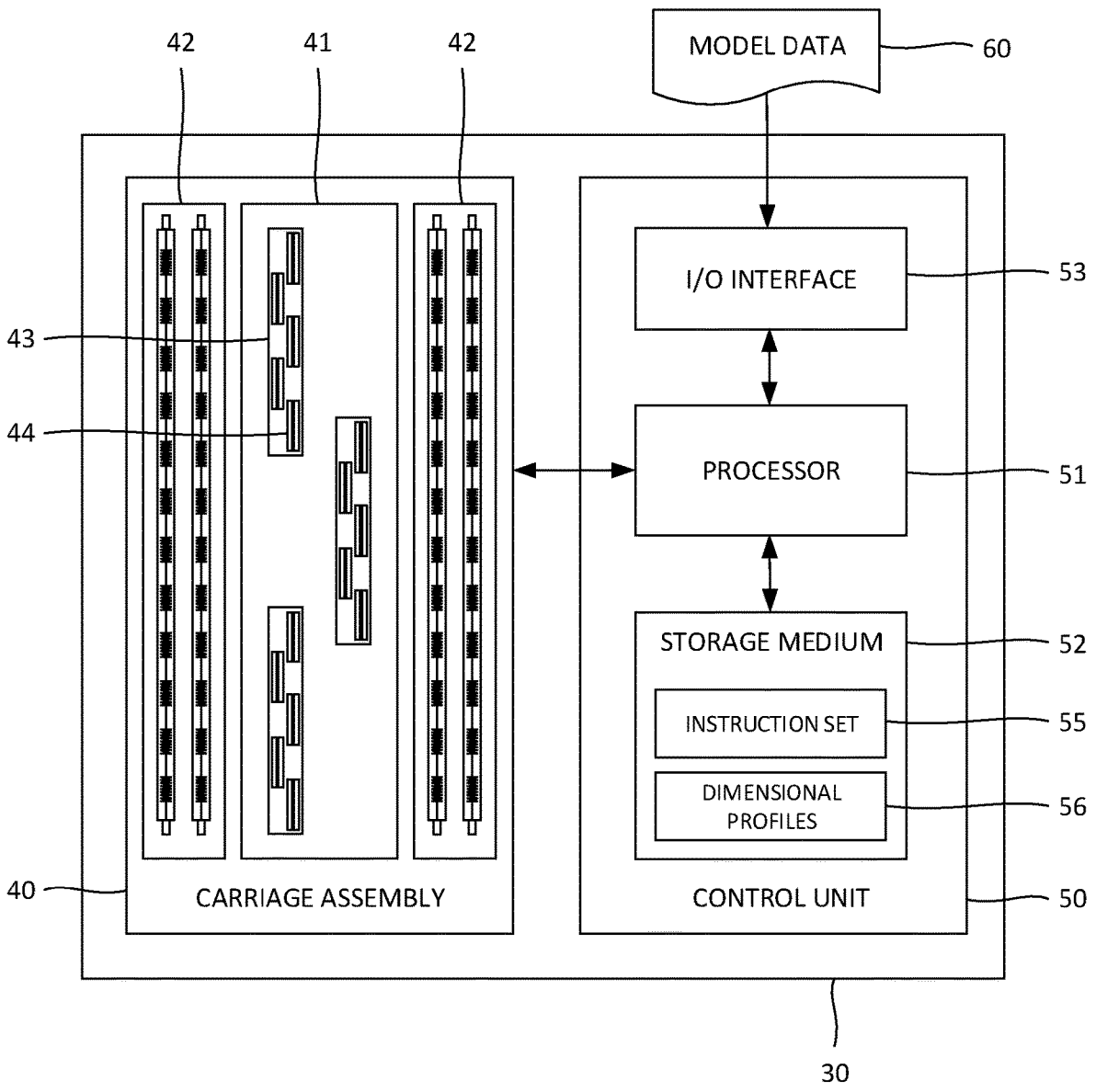
FIG. 4 illustrates an example 3D printing system.

FIG. 4 illustrates an example of a 3D printing system. The 3D printing system 30 comprises a carriage assembly 40 and a control unit 50.

The carriage assembly 40 comprises a printhead assembly 41 and a pair of heat lamps 42 located on either side of the printhead assembly 41. The printhead assembly 41 comprises a plurality of printheads 43. Each printhead 43 comprises a plurality of dies 44, with each die 44 comprising a plurality of nozzles through which drops of a fusing agent may be ejected onto a print bed.

The control unit 50 comprises a processor 51, a storage medium 52, and an input/output interface 53. The processor 51 is responsible for controlling the operation of the 3D printing system 30 and executes an instruction set 55 stored in the storage medium 52. The storage medium may also store dimensional profiles 56 and second surface offsets for different build materials.

During use of the 3D printing system 30, model data 60 representing an object to be printed is received at the input/output interface 53. The 3D printing system 30 may additionally receive other data regarding the object, such as the position of the object within the build volume and the build material to be used.

The processor 51 applies a first surface offset to the model data. The processor 51 may generate the first surface offset using a dimensional profile 56 (selected from the storage medium 52 according to the build material) together with the position of the object within the build volume. The processor 51 may generate the first surface offset using other data relating to a property of the object, such as the size and/or shape of the object, and/or the proximity of the object to other objects within the build volume.

The processor 51 converts the model data to voxel data, e.g. using an octree-based voxelization process. The processor may apply the first surface offset to the model data when converting the model data into voxel data, e.g. using a Minkowski sum.

The processor 51 then generates a plurality of bed layer images, each image corresponding to a layer of the build. For each bed layer, the processor 51 determines if the object is intersected by the layer, based on the position of the object within the build volume. If the object is intersected by the bed layer, the processor 51 extracts the corresponding slice of voxel data. The slice of voxel data is then positioned within the bed layer image.

The processor 51 applies a second surface offset to the object, e.g. by adding (positive offset) or removing (negative offset) pixels from the bed layer image. When applying the second surface offset, the processor may employ an SFP mechanism to prevent the removal of small features.

The processor 51 then converts each bed layer image into a bitmap image by converting the values of the pixels of the bed layer images from color values to contone values. The contone value for each voxel may depend on the position of the pixel within the object.

The processor 51 converts each bitmap image from contone values to halftone values or drop values, which specify the number of drops of fusing agent to be deposited at the corresponding voxel of the build layer.

The 3D printing system 30 then prints the object layer-by-layer using the bitmaps. For example, as the carriage assembly 40 is swept across the surface of the print bed, the printheads 43 deposit drops of fusing agent onto the layer of build material according to the corresponding bitmap image. The heat lamps 42 apply heat to the build material causing those portions of the build material onto which the fusing agent is deposited to fuse. The print bed is then lowered and a further layer of build material is deposited onto the print bed. The carriage assembly 40 is again swept across the print bed and the printheads 43 deposit drops of fusing agent according to the next bitmap image, and the process is repeated.

In the example described above, the printheads 43 deposit a fusing agent onto the build material. The printheads 43 might also deposit a detailing agent onto the build material. In an alternative example, the printheads 43 may deposit a binding agent, rather than a fusing agent, onto the build material. Accordingly, in a more general sense, the printheads 43 may be said to deposit a functional agent (e.g. fusing agent, detailing agent, binding agent) onto the print bed. Where the printheads 43 deposit a binding agent, the heat lamps 42 may be omitted or, depending on the binding agent used, may be retained and used to evaporate solvent within the binding agent. Alternatively, where the binding agent is UV-curable, the heat lamps 42 may be replaced with UV lamps to cure the binding agent after printing.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

The invention claimed is:

1. A method comprising:
   receiving, by a processor, first and second model data respectively describing first and second objects to be additively manufactured in a print job by an additive-manufacturing apparatus;
   determining, by the processor, first and second overall offsets for the first and second objects, respectively, to compensate for dimensional deformation when the first and second objects are additively manufactured;
   determining, by the processor, a first model data offset specific to the first object, based on the first overall offset and an average overall offset of the first and second overall offsets;
   applying, by the processor, the first model data offset to a surface of the first object in the first model data;

determining, by the processor, a second model data offset specific to the second object, based on the second overall offset and the average overall offset;

applying, by the processor, the second model data offset to a surface of the second object in the second model data;

respectively converting, by the processor, the first and second model data to first and second voxel data, after application of the first and second model data offsets;

applying, by the processor, the average overall offset to the surfaces of the first and second objects in the first and second voxel data, respectively; and causing the additive-manufacturing apparatus to additively manufacture the first and second objects in the print job using the first and second voxel data after application of the average overall offset.

2. The method of claim 1, wherein the average overall offset is greater than both the first and second model data offsets.

3. The method of claim 1, wherein applying the average overall offset comprises adding or removing voxels from the surfaces of the first and second objects.

4. The method of claim 1, further comprising:

generating, by the processor, first and second layer images comprising slices of the first and second voxel data, respectively, wherein applying the average offset comprises adding or removing pixels from the first and second layer images, each pixel corresponding to a voxel of a predetermined size.

5. The method of claim 1, wherein the first and second model data offsets depend on properties of the first and second objects, respectively.

6. The method of claim 5, wherein the property is one or more multiple of: build materials of the first and second objects, positions of the first and second objects within a build volume in the print job, sizes of the first and second objects, shapes of the first and second objects, and proximities of the first and second objects to other objects within the build volume.

7. The method of claim 1, further comprising:

identifying, by the processor, features of the first and second objects having a size less than a threshold, wherein the average offset is not applied to surfaces of the identified features.

8. A non-transitory computer-readable data storage medium storing program code executable by a processor to perform processing comprising:

receiving first and second model data respectively describing first and second objects to be additively manufactured in a print job by an additive-manufacturing apparatus;

determining first and second overall offsets for the first and second objects, respectively, to compensate for dimensional deformation when the first and second objects are additively manufactured;

determining a first model data offset specific to the first object, based on the first overall offset and an average overall offset of the first and second overall offsets;

applying the first model data offset to a surface of the first object in the first model data;

determining a second model data offset specific to the second object, based on the second overall offset and the average overall offset;

applying the second model data offset to a surface of the second object in the second model data;

respectively converting the first and second model data to first and second voxel data, after application of the first and second model data offsets;

applying the average overall offset to the surfaces of the first and second objects in the first and second voxel data, respectively; and causing the additive-manufacturing apparatus to additively manufacture the first and second objects in the print job using the first and second voxel data after application of the average overall offset.

9. The non-transitory computer-readable data storage medium of claim 8, wherein the average overall offset is greater than both the first and second model data offsets.

10. The non-transitory computer-readable data storage medium of claim 8, wherein applying the average overall offset comprises adding or removing voxels from the surfaces of the first and second objects.

11. The non-transitory computer-readable data storage medium of claim 8, wherein the processing further comprises:

generating first and second layer images comprising slices of the first and second voxel data, respectively, wherein applying the average overall offset comprises adding or removing pixels from the first and second layer images, each pixel corresponding to a voxel of a predetermined size.

12. The non-transitory computer-readable data storage medium of claim 8, wherein the first and second model data offsets depend on properties of the first and second objects, respectively.

13. The non-transitory computer-readable data storage medium of claim 8, wherein the processing further comprises:

identifying features of the first and second objects having a size less than a threshold, wherein the average overall offset is not applied to surfaces of the identified features.

14. An additive-manufacturing system comprising:

a processor; and a non-transitory computer-readable data storage medium storing program code executable by the processor to perform processing comprising:

receiving first and second model data respectively describing first and second objects to be additively manufactured in a print job by an additive-manufacturing apparatus;

determining first and second overall offsets for the first and second objects, respectively, to compensate for dimensional deformation when the first and second objects are additively manufactured;

determining a first model data offset specific to the first object, based on the first overall offset and an average overall offset of the first and second overall offsets;

applying the first model data offset to a surface of the first object in the first model data;

determining a second model data offset specific to the second object, based on the second overall offset and the average overall offset;

applying the second model data offset to a surface of the second object in the second model data;

respectively converting the first and second model data to first and second voxel data, after application of the first and second model data offsets;

applying the average overall offset to the surfaces of the first and second objects in the first and second voxel data, respectively;

causing the additive-manufacturing apparatus to additively manufacture the first and second objects in the print job using the first and second voxel data after application of the average overall offset.

15. The additive-manufacturing system of claim 14, wherein the average overall offset is greater than both the first and second model data offsets.

16. The additive-manufacturing system of claim 14, wherein applying the average overall offset comprises adding or removing voxels from the surfaces of the first and second objects.

17. The additive-manufacturing system of claim 14, wherein the processing further comprises:

generating first and second layer images comprising slices of the first and second voxel data, respectively, wherein applying the average overall offset comprises adding or removing pixels from the first and second layer images, each pixel corresponding to a voxel of a predetermined size.

18. The additive-manufacturing system of claim 14, wherein the first and second model data offsets depend on properties of the first and second objects, respectively.

19. The additive-manufacturing system of claim 14, wherein the processing further comprises:

identifying features of the first and second objects having a size less than a threshold, wherein the average overall offset is not applied to surfaces of the identified features.

20. The additive-manufacturing system of claim 14, wherein the additive-manufacturing apparatus is part of the additive-manufacturing system.

* * * * *